United States Patent [19]

Sengoku

[11] Patent Number: 4,979,059
[45] Date of Patent: Dec. 18, 1990

[54] SYSTEM FOR STORING DATA IN A SEPARATE MEMORY WHEN THE NUMBER OF POSITIONING ERRORS OF A MAGNETIC DISC EXCEEDS A THRESHOLD

[75] Inventor: Masaharu Sengoku, Amagasaki, Japan

[73] Assignee: Misubishi Denki Kabushiki Kaisha, Tokyo, Japan

[21] Appl. No.: 441,213

[22] Filed: Nov. 27, 1989

Related U.S. Application Data

[63] Continuation of Ser. No. 169,877, Mar. 18, 1988, abandoned.

[30] Foreign Application Priority Data

May 13, 1987 [JP] Japan ................................ 62-117414

[51] Int. Cl.⁵ .............................................. G11B 5/55
[52] U.S. Cl. ........................... 360/78.090; 360/78.040
[58] Field of Search ............... 360/78.04, 78.06, 78.08, 360/78.09

[56] References Cited

U.S. PATENT DOCUMENTS 4,547,822 10/1985 Brown .............................. 360/78.06

FOREIGN PATENT DOCUMENTS 58-177573 10/1983 Japan.
60-101777 6/1985 Japan.
62-97173 5/1987 Japan.

OTHER PUBLICATIONS

C. J. Kennedy, Timer to Sense an Incompleted Seek on Disk Files, IBM TDB, vol. 7, No. 11, Apr. 1965, pp. 1021-1022.

Primary Examiner—Aristotelis M. Psitos
Assistant Examiner—David L. Robertson
Attorney, Agent, or Firm—Oblon, Spivak, McClelland, Maier & Neustadt

[57] ABSTRACT

In a data memorizing device in which a magnetic head is supported on a recording surface of a disk-like recording medium carrier rotatably driven, an actuator carrying the magnetic head is moved to bring the magnetic head to a predetermined position on the magnetic recording medium carrier, an error detection circuit compares a position-determining time required in the movement of the magnetic head from starting the movement of the head to the completion of the movement with a reference time previously determined by an instruction from a computer, and outputs a positioning-error signal in accordance with the determination of error in positioning the magnetic head when the value of the position-determining signal is greater than the value of a reference time. The data memorizing device further comprises an error factor detection means which counts the number of errors in determining the position of the head on the basis of the number of the positioning-error signals provided by the error detection circuit in the positioning operation conducted for a predetermined time period or the positioning operations conducted at a predetermined number, and outputs a pulse signal when the value of a positioning-error factor, which is obtained by dividing the number of the errors by the predetermined time period or the predetermined number in the position-determining operations, is greater than a predetermined value as a result of comparison of the values.

4 Claims, 5 Drawing Sheets

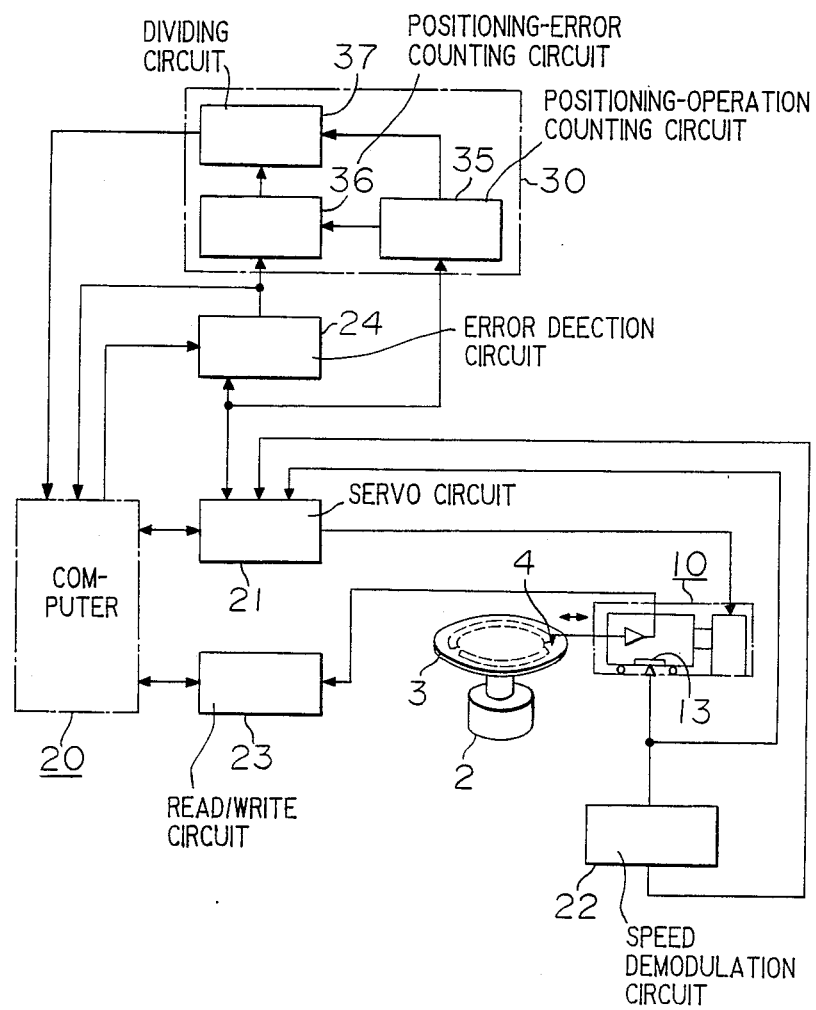

SYSTEM FOR STORING DATA IN A SEPARATE MEMORY WHEN THE NUMBER OF POSITIONING ERRORS OF A MAGNETIC DISC EXCEEDS A THRESHOLD

This application is a continuation of application Ser. No. 169,877, filed on March 18, 1988 now abandoned.

BACKGROUND OF THE INVENTION

FIELD OF THE INVENTION

The present invention relates to a data memorizing device capable of recording or reproducing data by a relative movement between a disk-like recording medium carrier which records data by causing a change in a physical condition on the surface of the recording medium carrrier and a magnetic head placed near the surface of the recording medium carrier.

DISCUSSION OF BACKGROUND

FIG. 4 is a cross-sectional view showing a conventional data memorizing device similar to that disclosed in, for instance, Japanese Unexamined Patent Publication 101777/1985, and FIG. 5 is a block diagram showing a position-determining control system for the data memorizing device.

In FIG. 4, a reference numeral 1 designates a base, a numeral 2 designates a spindle motor fixed to the base, a numeral 3 designates a disk-like recording medium carrier, namely, a magnetic disk attached to the rotary shaft of the spindle motor, a numeral 4 designates a magnetic head held near a surface of the magnetic disk 3. The magnetic head 4 is adapted to convert an electric signal into a change of magnetic condition on the surface of the magnetic disk 3 or to convert a change of the magnetic condition into an electric signal. A numeral 5 designates a spring for urging the magnetic head 4 to the magnetic disk 3 by its spring action, numeral 6 designates an arm for fixedly supporting the compression spring 5, numeral 10 designates an actuator adapted to move the magnetic head 4 in the radial direction of the magnetic disk by the aid of the arm 6 and the spring 5 and numeral 11 designates a carriage for supporting the arm 6, the carriage being movable on the base 1 by means of bearings.

A driving coil 12 is mounted on the carriage 11. A position sensor 13 comprises an optical scale fixed to the carriage 11 and a transducer fixed to the base 1. A numeral 15 designates a yoke for forming a magnetic path and a numeral 16 designates a magnet attached to the yoke.

In FIG. 5, reference numeral 20 designates a computer for processing data for controlling the position and the speed of the magnetic head 4, numeral 21 designates a servo circuit which receives a position-determining instruction signal from the computer 20 and drives the carriage 11 by actuating the driving coil 12 in the actuator 10. Also, the servo circuit 21 is adapted so that it receives a position signal indicating the position of the magnetic head 4 detected by the position sensor 13 on the magnetic disk 3 and a speed signal obtained by differentiating and shaping the position signal. It compares, on one hand, the position-determining instruction signal from the computer 20 with the position signal, and on the other hand, a speed-determination signal from the computer 20 with the speed signal from a speed demodulation circuit 22, which differentiates and shapes the position signal detected by position sensor 13 and outputs a signal indicative of position-determining time which corresponds to a time required from the starting position-determining operation to the finish of it. A numeral 23 designates a read/write circuit which receives a data recording/reproducing instruction signal from the computer 20 to record the data in the magnetic disk 3 or to reproduce the data stored in the magnetic disk 3 through the magnetic head 4.

A reference numeral 24 designates an error detection circuit which receives a reference time signal from the computer 20 and the position-determining time signal from the servo circuit 21, and outputs a position-error signal in accordance with the determination that there takes place an error in positioning the magnetic head when the value of the position-determining signal is greater than the value of the reference time signal. The reference time signal corresponds to a reference position-determining time which is determined by the computer 20 on the basis of a distance of moved by the magnetic head 4 on the magnetic disk 3 and a speed pattern obtained by the movement of the head 4.

The operation of the conventional data memorizing device having the construction as above-mentioned will be described.

When the magnetic disk 3 is rotated at a predetermined revolution by driving the spindle motor 2, it produces a viscous air stream on and near the surface of the magnetic disk 3 and a floating force is applied to the magnetic head 4 which is held in the vicinity of the recording surface, whereby there is obtained a fluid dynamic spacing function by which a predetermined air gap is kept between the magnetic head 4 and the magnetic disk 3 due to the balance between a pressing force by the compression spring 5 and the viscous air stream. Under such condition, when a position-determining instruction signal is supplied to the servo circuit 21 from the computer 20, an electric current corresponding to the position-determining instruction signal is supplied to the driving coil 12 in the actuator 10, whereby a magnetic circuit is formed in the yoke 15, the magnet 16 and the air gap. In accordance with the Flemming's left hand rule, the carriage 11 is driven by the influence of the magnetic field by the magnetic circuit, and the magnetic head 4 is moved in the radial direction of the magnetic disk 3. The traverse movement of the magnetic head 4 is detected by the position sensor 13, which generates a position signal corresponding to the position of the head 4. Further, the position signal is subjected to differentiating and shaping by the speed demodulation circuit 22 to detect a speed signal. The position signal and the speed signal are detected by the servo circuit 21 in which the signals are respectively compared with the position-determining instruction signal and the speed-determination instruction signal from the computer 20, whereby the magnetic head 4 is brought to a predetermined position on the magnetic disk 3. During the above-mentioned position-determining operation, the servo circuit 21 outputs a position-determining time signal which corresponds to the time required for positioning of the magnetic head 4. The error detection circuit 24 receives the position-determining time signal from the servo circuit 21 and compares it with the reference time signal corresponding to the reference position-determining time which has been previously received from the computer 20. In comparison of the signals, when the value of the position-determining time signal is greater than the value of the reference time signal, the servo circuit determines that there is an error in determining the position of the magnetic head 4, whereby the positioning-error signal is outputted. The positioning-error signal is received in the computer 20 in which the signal is subjected to a predetermined data-processing and a position-determining instruction signal is again outputted to the servo circuit 21. On completion of the position-determining operation, the read/write circuit 23 commands the magnetic head 4 to record data in the magnetic disk 3 or to reproduce data stored in the magnetic disk 3 by receiving a recording or reproduction instruction signal from the computer 20.

However, the conventional data memorizing device has a disadvantage as follows. When a foreign substance enters in the gap formed between the magnetic head 4 and the surface of the magnetic disk by the fluid dynamic spacing function, or strong vibrations or a strong shock is applied to the base 1, the magnetic head 4 may come to contact with the surface of the magnetic disk 3 to thereby damage either the surface of the magnetic disk 3 or the head 4. The damaged surface of the magnetic disk or the magnetic head 4 causes a change in a floating force applied to the head 4. If such an undesirable state remains for a long time, the magnetic head 4 drops on the magnetic disk 3 to thereby cause data stored in the magnetic disk 3 to be lost.

SUMMARY OF THE INVENTION

It is an object of the present invention to provide a data memorizing device capable of preventing data stored in the magnetic disk from being lost even though a magnetic head drops on the surface of a magnetic disk.

The foregoing and the other objects of the present invention have been attained by providing a data memorizing device comprising a rotatable disk-like recording medium carrier, a magnetic head placed near a recording surface of the recording medium carrier, an actuator for supporting the magnetic head and adapted to cause a traverse movement on the recording surface so that the magnetic head is brought to a predetermined position on the recording surface, a servo circuit for driving the actuator in accordance with an instruction signal from a computer, an error detection circuit which compares a position-determining time required for the movement of the magnetic head from starting the movement of the head to the completion of the movement with a reference time previously determined by an instruction from the computer and outputs a positioning-error signal in accordance with the determination of error in positioning the magnetic head when the value of the position-determining signal is greater than the value of the reference time, and an error factor detection means which counts the number of errors in determining the position of the head on the basis of the number of the positioning-error signals provided by the error detection circuit in the positioning operation conducted for a predetermined time period or positioning operations conducted at a predetermined number, and outputs a pulse signal when the value of a positioning-error factor, which is obtained by dividing the number of the errors by the predetermined time period or the predetermined number in the position-determining operations, is greater than a predetermined value as a result of comparison of the values.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 3 and 3a are block diagrams showing another embodiment of the data memorizing device of the present invention;

DETAILED DESCRIPTION OF THE PREFERRED EMBODIMENTS

Figure 1:
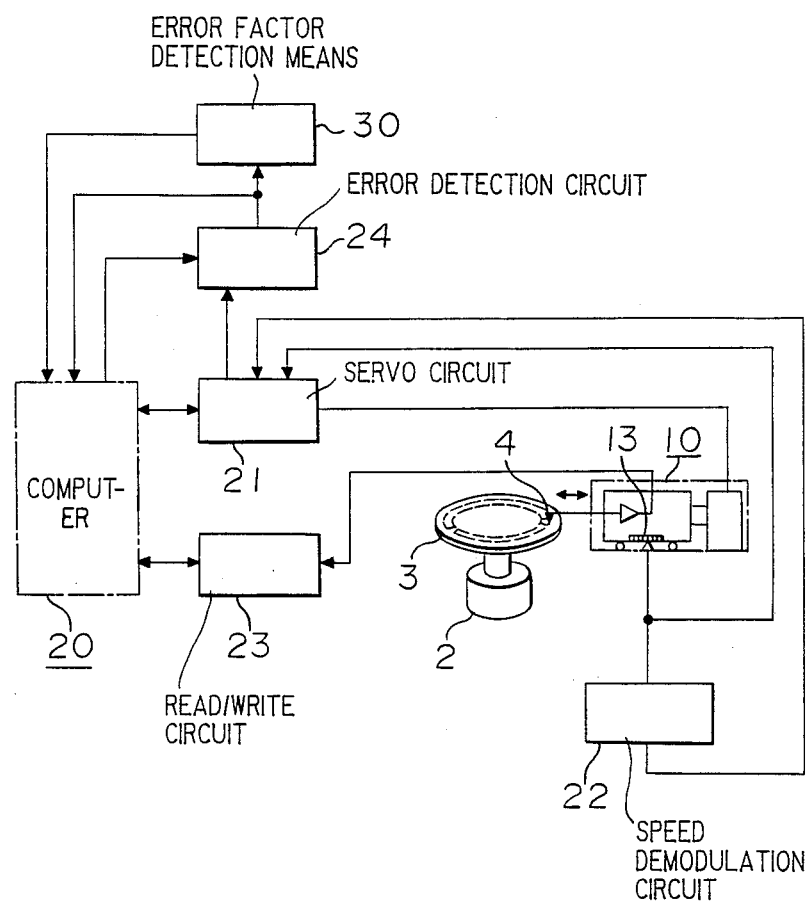
FIG. 1 is a block diagram showing an embodiment of the position-determining control system for the data memorizing device according to the present invention.

Referring to the drawings, wherein the same reference numerals designate the same or corresponding parts, and more particularly to FIG. 1 thereof, there is shown a block diagram of an embodiment of the data memorizing device according to the present invention.

In FIG. 1, a reference numeral 30 designates an error factor detection means which is adapted to count the number of errors in the determination of position of the magnetic head on the basis of the number of the positioning-error signals provided by the error detection circuit 24 in the positioning operation over a predetermined time. Alternatively, the number of errors may be counted over a predetermined number of positioning operations. It outputs a pulse signal when the value of a positioning error factor is greater than a predetermined value. The factor is obtained by dividing the number of errors by the predetermined time or by the predetermined number of position-determining operations.

The operation of the data memorizing device having the above-mentioned construction will be described.

When the magnetic disk 3 is rotated at a predetermined revolution speed, a viscous air stream is produced on or near the surface of the magnetic disk 3, whereby the magnetic head 4 placed in the vicinity of the surface of the magnetic disk 3 floats due to the viscous air stream. Thus, a small air gap is maintained between the magnetic head 4 and the surface of the magnetic disk 3 by a fluid dynamic spacing air bearing function.

Under such conditions, when a position-determining instruction signal is supplied to the servo circuit 21 from the computer 20, an electric signal which corresponds to the position-determining instruction signal is fed to the actuator 10, whereby the magnetic head 4 is moved in the radial direction of the magnetic disk 3 by means of the actuator 10. The traverse movement of the magnetic head 4 is detected by the position sensor 13, which outputs a position signal. The position signal supplied to the speed demodulation circuit 22 is subjected to differentiating and shaping operations, whereby a speed signal is produced. The position signal and the speed signal are supplied to the servo circuit 21. The servo circuit 21 compares the position signal with the position-determining instruction signal from the computer 20, and also, it compares the speed signal with a speed-determination instruction signal from the computer 20, so that the magnetic head 4 is set at a predetermined location of the magnetic disk 3. During the position-determining operations, the servo circuit 21 outputs a position-determining time signal which corresponds to the time from the start of the position-determining operation to the finish of it.

An error detection circuit 24, on one hand, receives the position-determining time signal from the servo circuit 21 and, on the other hand, receives previously from the computer 20 a reference time signal which corresponds to a reference time for positioning the magnetic head 4 and compares them to determine whether or not the value of the position-determining time signal is greater than the value of the reference time signal. When the former is greater than the latter, the error detection circuit 24 determines that there is an error in the determination of the position of the magnetic head 4 and outputs a positioning error signal. On receiving the positioning-error signal from the error detection circuit 24, the computer 20 processes the signal and outputs a position-determining instruction signal to the servo circuit 21 again. Thus, such a step is repeated until the magnetic head is brought to a predetermined position which corresponds to the originally output position-determining instruction signal.

An error factor detection means 30 receives the positioning-error signal from the error detection circuit 24 and counts the number of errors in determining the position of the magnetic head on the basis of the positioning-error signal in the positioning operation conducted for a predetermined time or the positioning operations conducted for a predetermined number so that the error factor detection means 30 outputs a pulse signal when the value of a positioning-error factor, which is obtained by dividing the number of the error occurred by the predetermined time or the predetermined number in the position-determining operations, is greater than a predetermined value. The computer 20 outputs a reproduction instruction signal to a read/write circuit 23 upon receiving the pulse signal, whereby data stored in the magnetic disk 3 is reproduced by the magnetic head 4 so that the reproduced data are shifted into a memory in the computer 20. Since the output signal of the error factor detection means indicates a problem with positioning the head, the storage of data in the computer ensures that the data will not be lost in case the head drops on the disk.

Figure 2:
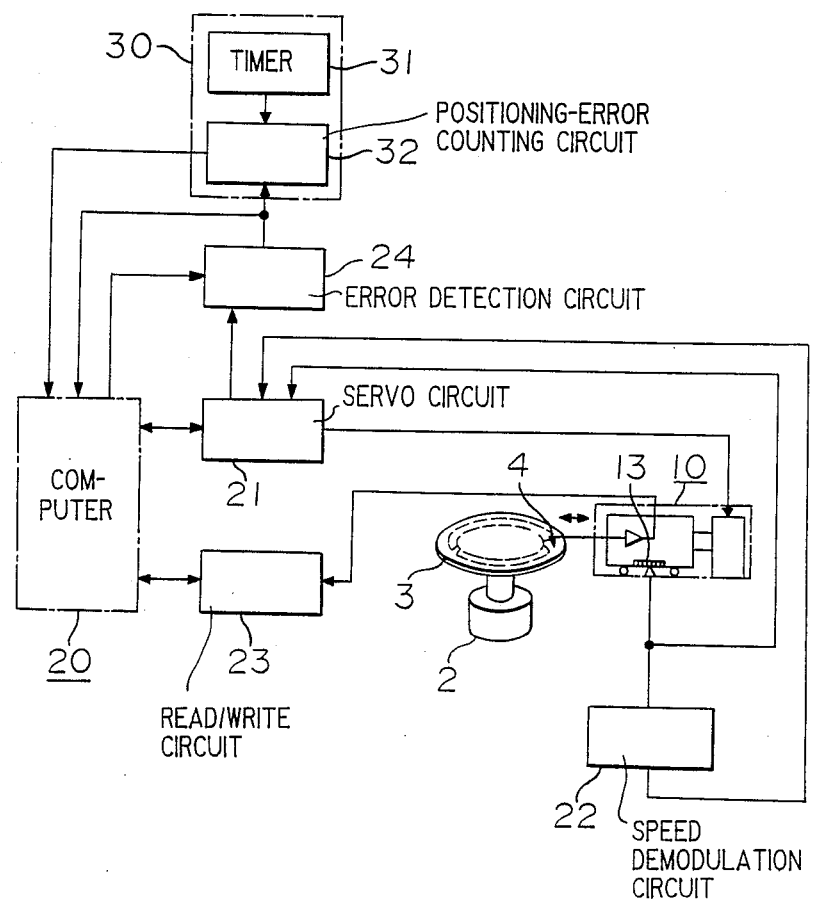
FIGS. 2 and 2a are block diagrams showing another embodiment of the present invention.

FIG. 2 is a block diagram showing another embodiment of the present invention, particularly, it shows the data memorizing device of the present invention in more specific manner. In FIG. 2, the same reference numerals as in FIG. 1 designate the same or corresponding parts. The error factor detection means 30 comprises a timer 31 and a positioning-error counting circuit 32. The timer 31 is adapted to output a time signal when a predetermined time lapses. The positioning-error counting circuit 32 is so adapted that is counts the number of errors in the positioning operations for the magnetic head on the basis of the positioning-error signal outputted from the error detection circuit 24 and stops the counting operation upon receiving the time signal from the timer 31, and that it outputs a pulse signal when the value of a positioning-error factor, which is obtained by dividing the number of the errors counted by the value of a predetermined time previously set in the timer 31, is greater than a predetermined value.

Figure 2A:
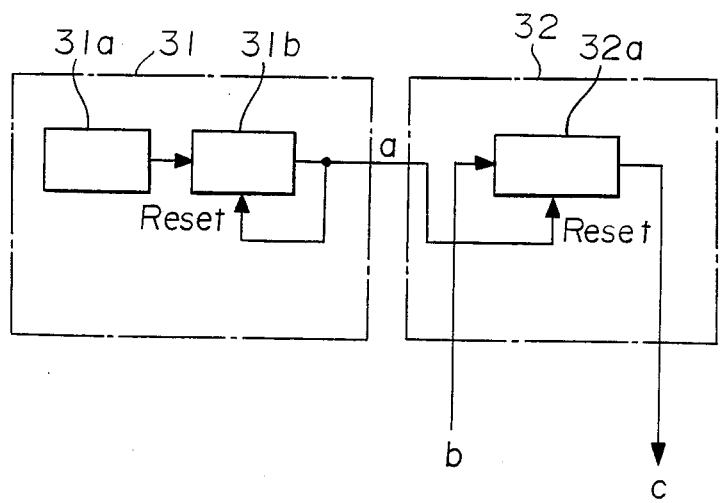

FIG. 2a is a diagram showing the construction of the error factor detection means 30 in more detail.

The timer 31 comprises an oscillator 31a such as a crystal oscillator and a counter 31b, which is adapted to count the outputs of the oscillator 31a and to reset the counting operation when the counted number exceeds a predetermined value and at the same time, the counting operation is restarted. The timer 31 may be a software timer in which a counting routine is repeated in accordance with a software program and the counting operation is reset when the counted number exceeds a predetermined number. The positioning-error counting circuit 32 comprises a counter 32a which counts the number of errors (seek error signals b) and outputs a signal (carry signal c) when a value indicative of the time (from setting of the counter 31b to resetting of the same) given by the timer 31 exceeds a predetermined value. The circuit 32 may be also a software timer.

The operation of the second embodiment of the present invention will be described.

When the magnetic disk 4 is rotated at a predetermined revolution speed by the actuation of the spindle motor 2, a viscous air stream is produced on or near the surface of the magnetic disk, whereby the magnetic head placed in the vicinity of the surface of the magnetic disk 3 floats due to the viscous air stream. Thus, a small air gap is maintained between the magnetic head 4 and the surface of the magnetic disk 3 by a fluid dynamic spacing function in the same manner as described with reference to FIG. 1. Then, the position-determining instruction signal is supplied from the computer 20 to the servo circuit 21, whereby the actuator 10 is driven to bring the magnetic head 4 at a predetermined position on the magnetic disk 3. During the position-determining operations, the servo circuit 21 outputs the position-determining time signal which corresponds to the time from the start of the position-determining operation for the magnetic head 4 to the finish of it.

The computer 20 calculates the reference time for determining the position of the magnetic head 4 on the basis of a moved distance of the head 4 on the surface of the magnetic disk 3 and a speed pattern obtained by the movement of the head 4, and outputs a reference time signal corresponding to the reference time.

The error detection circuit 24 compares the position-determining time signal from the servo circuit 21 with the reference time signal from the computer 20, and outputs the positioning-error signal under the judgement that an error takes place in the position-determining operations when the value of the position-determining time signal is greater than the value of the reference time signal.

The positioning-error signal from the error detection circuit 24 is processed in the computer 20, which again outputs a position-determining instruction signal to the servo circuit 21 so that the magnetic head is brought to a predetermined position corresponding to the original time-determining instruction signal. Thus, such position-determining operation is repeated until the magnetic head is correctly positioned. Simultaneously, the positioning-error counting circuit 32 counts the number of errors in the position-determining operation on the basis of the positioning-error signal from the error detection circuit 24 until the counting circuit 32 receives the time signal from the timer 31, and outputs the pulse signal when the value of the positioning-error factor, which is obtained by dividing the number of the errors by the predetermined time previously set in the timer 31, is greater than the predetermined value.

The computer 20 outputs a reproduction instruction signal to the read/write circuit 23 upon receiving the pulse signal, whereby data in the magnetic disk 3 is reproduced by the magnetic head 4 so that the data are again recorded in a memory in the computer 20.

FIG. 3 is a block diagram showing another embodiment of the present invention. In FIG. 3, the same reference numerals designate the same or corresponding parts.

The error factor detection means 30 comprises a positioning-operation counting circuit 35, a positioning-error counting circuit 36 and a dividing circuit 37.

The positioning-operation counting circuit 35 is so adapted that it counts the number of the position-determining operations on the basis of the position-determining time signals outputted from the servo circuit 21; the counting operation is reset when the counted number reaches a predetermined value, and on resetting, a reset signal corresponding to the resetting and a signal corresponding to the predetermined value are outputted.

The positioning-error counting circuit 36 is so adapted that it counts the number of errors in the position-determining operations on the basis of the positioning-error signals outputted from the error detecting circuit 24; the counting operation is reset upon receiving the reset signal from the positioning-operation counting circuit 35, and a signal indicative of the number of errors which corresponds to the number of errors occurred in the position-determining operation.

The dividing circuit 37 is so adapted that the signal indicative of the number of the position determination from the positioning-operation counting circuit 35 and the signal indicative of the number of the errors from the positioning-error counting circuit 36 are received. A positioning-error factor is calculated by dividing the number of the errors in the determination of the position by the number of the determination of the position, and a pulse signal is outputted when the value of the positioning-error factor is greater than the value of a previously determined value.

In the above-mentioned embodiment, data stored in the magnetic disk 3 can be reproduced on receiving the pulse signal from the dividing circuit 37 so that the data are recorded in a memorizing device in the computer 20; thus, the same function as those in the previously mentioned embodiments can be attained.

In FIG. 2 or 3, the same function can be obtained by using a micro-processor instead of the combination of the timer 31, the positioning-error counting circuit 32, or the combination of the positioning-operation counting circuit 35, the positioning-error counting circuit 36 and the dividing circuit 37.

Figure 3A:
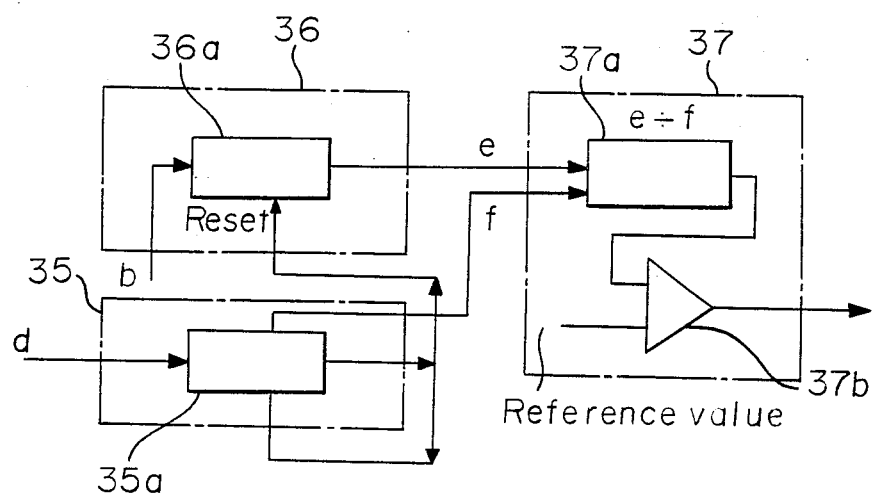
Figure 4:
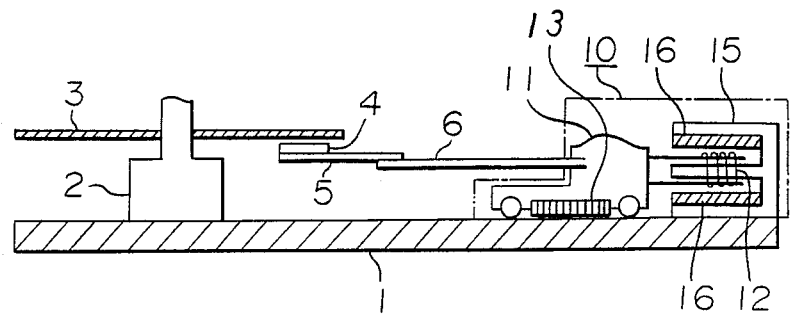
FIG. 4 is a diagram showing a conventional data memorizing device.
Figure 5:
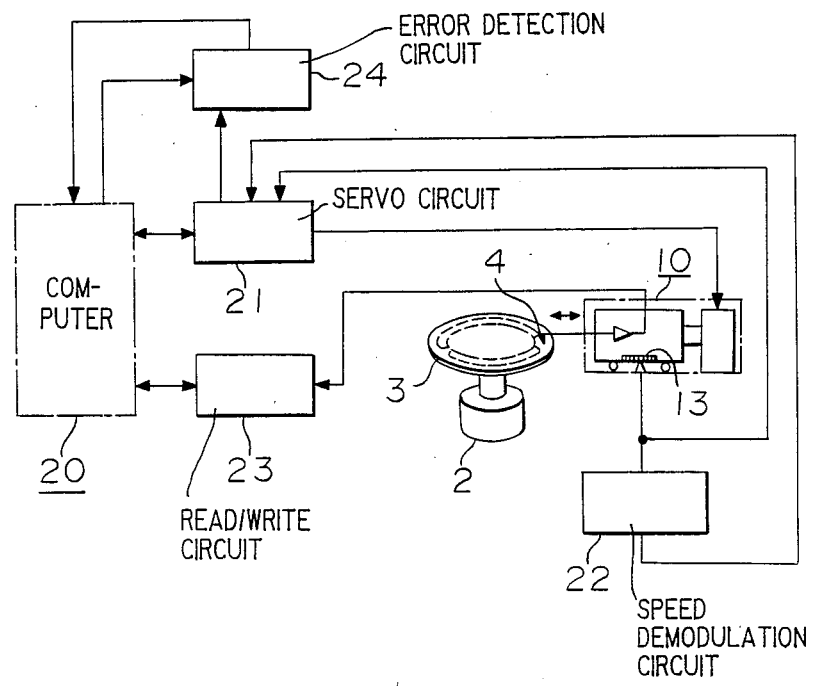
FIG. 5 is a block diagram of the position-determining control system used for the conventional device.

FIG. 3a is a diagram showing the construction of the positioning-operation counting circuit 35, the positioning-error counting circuit 36 and the dividing circuit 37.

The positioning-operation counting circuit 35 comprises a counter 35a which counts the number of the positioning operations (the signals d of seeking operation) and which resets the counting operation when the counted number exceeds a predetermined value and at the same time, a reset signal supplied to a counter 36a constituting the positioning-error counting circuit 36. On the other hand, the number signal f of the counted number is supplied to a divider 37a. The counter 36a receives a signal b indicative of the number of errors from the error detection circuit 24 and a signal e of the counted number is supplied to the divider 37a where operation of e$\approx$f is carried out. The calculated value is compared with a reference value in a comparator 37b. The circuit may be formed by a software method as in the same manner as the circuit in FIG. 2a.

The present invention is applicable to a data memorizing device utilizing a disk-like recording medium carrier other than that utilizing a magnetic recording means.

Thus, in the data memorizing device of the present invention, the number of errors occurred in the determination of the position of the magnetic head are counted, and a pulse signal is outputted when the value of a positioning error factor is greater than a predetermined value, whereby data stored in the magnetic disk are shifted to another data memory before the data are lost by the falling of the magnetic head on the magnetic disk to cause the failure of the recording surface of the disk.

Obviously, numerous modifications and variations of the present invention are possible in light of the above teachings. It is therefore to be understood that within the scope of the appended claims, the invention may be practiced otherwise than as specifically described herein.

What is claimed is:
1. A data memorizing device which comprises:
   a rotatable disk-like recording medium carrier,
   a magnetic head placed near a recording surface of said recording medium carrier,
   an actuator for supporting said magnetic head and adapted to cause a traverse movement on said recording surface so that said magnetic head is brought to a predetermined position on said recording surface,
   a servo circuit for driving said actuator in accordance with an instruction signal from a computer,
   an eror detection circuit which compares a position-determining time which is the time required for the movement of said magnetic head from beginning the movement of said head to the completion of the movement with a reference time which is previousl determined by said computer and outputs an error signal when the value of said position-determining the signal is greater than the value of said reference time, and
   an error factor detection means which counts the number of said error signals provided by said error detection circuit said number of error signals being counted over a predetermined time period and/or a predetermined number of positioning operations, wherein said error factor detection means outputs a pulse signal when the value of a positioning-error factor, is greater than a predetermined value, said positioning-error factor being obtained by dividing said number of error signals by said predetermined time period and/or said predetermined number of positioning operations.

2. The data memorizing device according to claim 1, wherein said error factor detection means comprises a timer and an error counting circuit.

3. The data memorizing device according to claim 1, wherein said error factor detection means comprises a dividing circuit, an error counting circuit and a positioning-operation counting circuit.

4. The data memorizing device according to claim 1, further comprising;
   a memory means;
   wherein information on said recording medium carrier is read by said magnetic head and stored in said memory menas when said pulse signal is generated by said error factor detection means.

* * * * *